United States Patent Office 2,890,947
Patented June 16, 1959

---

2,890,947

GASOLINE MOTOR FUEL

Weldon G. Annable, Mundelein, and Robert M. Haines, Crystal Lake, Ill., assignors to The Pure Oil Company, Chicago, Ill., a corporation of Ohio No Drawing. Application November 14, 1956
Serial No. 622,001

13 Claims. (Cl. 44—69)

This invention relates to motor fuels and particularly motor fuels for use in spark-ignited, internal combustion engines. The invention is more particularly concerned with motor fuels containing a small amount of additive to mitigate the formation of deposits in the induction systems of automotive engines and to the method for inhibiting formation of such deposits.

Motor fuels containing tetraethyl lead have a tendency to deposit solid material in the induction system, that is the area between the carburetor and combustion chamber of internal combustion engines and interfere with the efficient operation of the engine. We have discovered that induction system deposits can be greatly mitigated by adding to the motor fuel or gasoline small amounts of certain types of additives.

An object of the invention is to provide an additive which when added to leaded motor fuel will lessen the tendency of the motor fuel to form deposits in the induction systems of internal combustion engines.

Another object of the invention is to provide a leaded motor fuel which will not form deposits or which forms only small amounts of deposits in the induction system of an automotive engine of the internal combustion type.

A further object of the invention is to provide a method for mitigating deposition in the induction system of internal combustion engines.

Other objects of the invention will make themselves manifest from the following detailed description of the invention.

We have discovered that carbamyl dithiophosphates, also known as carbamyl phosphorodithioates, when added to leaded gasoline or motor fuel in small quantities greatly mitigate the tendency of such fuels to form deposits in the induction system for spark ignition type internal combustion engines. These deposits tend to form in the area between the carburetor and the combustion chamber of the engine, particularly in the intake manifold and on the valves, causing constriction of the intake manifold and preventing proper closing of the valves, with resultant burning thereof. This tendency to form deposits is aggravated in connection with the use of modern fuels containing in addition to saturated hydrocarbons, unsaturated and aromatic hydrocarbons and tetraethyl lead.

We have found that by adding to such motor fuels at least one carbamyl dithiophosphate in an amount between about 0.005 and 5% by weight, induction system deposits can be eliminated or greatly reduced. We have found that the additive in the amount of about 0.01% by weight is effective for this purpose. This corresponds to about 25 pounds of carbamyl dithiophosphates per 1000 barrels of gasoline or similar motor fuel.

Carbamyl dithiophosphates usful in our invention have the general formula

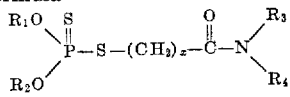

in which $R_1$ and $R_2$ are alkyl radicals containing at least four carbon atoms in each radical, $R_3$ and $R_4$ are hydrogen or alkyl radicals, and $x$ is one or any multiple thereof. In order for the compound to be effective for mitigating deposits it must be soluble in the motor fuel or gasoline to some extent. However, since carbamyl dithiophosphates as hereinbefore defined are effective in amounts between 0.0001 and 5% by weight of the gasoline, it is necessary that they be soluble in the gasoline only to that extent.

Examples of compounds which are effective for the purpose of this invention are the following:

(1) Carbamylmethyl O,O'-di-n-butyl phosphorodithioate

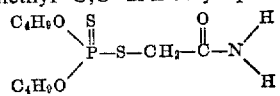

(2) Carbamylmethyl O-butyl-O' amyl phosphorodithioate

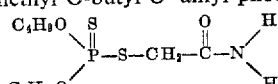

(3) N-methylcarbamyl-methyl O,O'-di-n-butyl phosphorodithioate

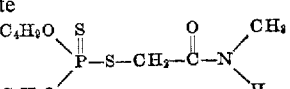

(4) Carbamyloctadecyl O,O' - di - n - butyl phosphorodithioate

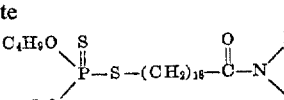

(5) N-ethyl-N-butylcarbamylethyl O-butyl-O'-amyl phosphorodithioate

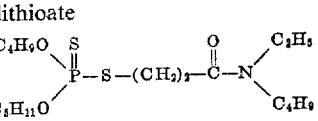

Additional examples of compounds are: carbamylmethyl O,O'-di-n-octadecyl phosphorodithioate, carbamylmethyl O-cetyl-O'-octadecyl phosphorodithioate, carbamylmethyl O,O'-di-n-butyl phosphorodithioate, di-n-ethylcarbamyl-methyl O,O'-di-n-butyl phosphorodithioate, n-cetyl-N-octadecylcarbamyl-methyl O,O'-di-n-butyl phosphorodithioate, carbamylethyl O,O'-di-n-butyl phosphorodithioate, carbamylethyl O,O'-di-2-ethylhexyl phosphorodithioate, carbamylmethyl O,O'-di-2-ethylhexyl phosphorodithioate, N-t-butylcarbamylethyl O,O'-di-2-ethylhexyl phosphorodithioate, N-lauryl-N-octadecylcarbamyloctadecyl O-cetyl-O'-octadecyl phosphorodithioate, di-N-hexylcarbamylpropyl O,O'-di-n-decyl phosphorodithioate, n-butylcarbamylbutyl O,O'-di-n-butyl phosphorodithioate, carbamyloctyl O,O'-di-n-nonyl phosphorodithioate, and di-n-laurylcarbamylmethyl O-2-ethylbutyl-O'-2 methyl-3-ethylbutyl phosphorodithioate.

The formulae for these compounds can be readily deduced from the nomenclature and formulae given for the first five compounds.

The carbamyl phosphorodithioates can be readily prepared by reacting a dialkyl phosphorodithioic acid with an alpha-chlorinated acid amide of the desired acid in the presence of an excess of ammonia. As an example, carbamylmethyl O,O'-di-2-ethylhexyl phosphorodithioate is prepared by reacting 0.13 mol of O,O'-di-2-ethylhexyl phosphorodithioic acid with 11.7 grams (0.13 mol) of alpha-chloro acid amide while bubbling ammonia through the reaction mixture over a period of 1.5 hours with constant stirring. The product is filtered through celite to separate the ammonium chloride precipitate, and then stripped under vacuum in a nitrogen atmosphere. The residual product from the vacuum stripping is the desired carbamyl ester. Obviously, if a substituted-carbamyl ester is to be prepared, a chloro acid amide having the desired alkyl groups substituted for hydrogen in the amide radical will be used to react with the dialkyl phosphorodithioic acid.

In order to demonstrate the invention, a series of tests were run in which a particular carbamyl phosphorodithioate was added to gasoline in the amount of 25 pounds of phosphorodithioate per 1000 barrels of gasoline (approximately .01% by weight). The gasoline used in the tests was prepared by fluid catalytic cracking of mineral oil and had the following characteristics:

| | | |
|---|---|---|
| Reid vapor pressure | p.s.i. | 8.2 |
| ASTM dist.: | | |
| IBP | °F | 104 |
| 5% | °F | 122 |
| 10% | °F | 132 |
| 20% | °F | 148 |
| 30% | °F | 168 |
| 40% | °F | 192 |
| 50% | °F | 224 |
| 60% | °F | 260 |
| 70% | °F | 295 |
| 80% | °F | 331 |
| 90% | °F | 372 |
| 95% | °F | 399 |
| E.P | °F | 412 |
| Manifold deposit | gram | 0.0894 |

The gasoline also contained 3 mls. of tetraethyl lead per gallon, 10 pounds of anti-oxidant, and 0.25 pound of metal deactivator per 1000 barrels of gasoline. The tests were run on a one-cylinder Lawson engine and each test lasted for a period of 12 hours. A blank run was made without any carbamyl dithiophosphate present in the gasoline and this run produced a manifold deposit of 0.0894 gram. The gasoline to which carbamyl ethyl di-2-ethylhexyl dithiophosphate was added reduced the manifold deposit by 75%, as compared to the blank run. The fuel to which n-tertiary N-t-butylcarbamylethyl di-2-ethylhexyl dithiophosphate was added reduced the manifold deposit by 61% by weight as compared to the blank run, and carbamylmethyl di-2-ethylhexyl dithiophosphate reduced the manifold deposit by 61% by weight as compared with the blank run.

The carbamyl dithiophosphates are useful for mitigating deposits when used in connection with motor fuels containing unsaturated hydrocarbons, such as olefins and diolefins, aromatic hydrocarbons, tetraethyl lead, and other additives, such as metal deactivators, corrosion inhibitors, and oxidation inhibitors, either alone or in combination. All these substances contribute to a greater or lesser degree toward the deposits in the intake system of the engine.

By reducing the deposit formation in the intake system improved engine performance is obtained because of better fuel distribution to the individual cylinders and proper functioning of the valves. Furthermore, the life of the engine is prolonged by reason of the avoidance of burning of valves.

We claim as our invention:

1. A gasoline motor fuel suitable for spark ignition type internal combustion engines, and which has a tendency to form solid deposits in the intake system of the engine, containing dissolved therein a small quantity sufficient to inhibit formation of said intake system deposits of at least one compound conforming to the formula

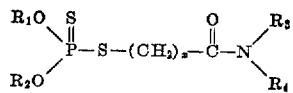

in which $R_1$ and $R_2$ are alkyl radicals each of which contains at least 4 carbon atoms, $R_3$ and $R_4$ are selected from the group consisting of hydrogen and alkyl radicals, and $x$ is any integer.

2. A gasoline motor fuel suitable for spark ignition type internal combustion engines, and which has a tendency to form solid deposits in the intake system of the engine, containing dissolved therein a small quantity sufficient to inhibit formation of said intake system deposits of at least one compound conforming to the formula

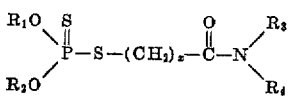

in which $R_1$ and $R_2$ are $C_4$–$C_{18}$ alkyl radicals, $R_3$ and $R_4$ are selected from the group consisting of hydrogen and $C_1$–$C_{18}$ alkyl radicals, and $x$ is from 1 to 18.

3. A motor fuel in accordance with claim 2 in which the compound is dissolved in a quantity between 0.005 and 5% by weight of the fuel.

4. A motor fuel in accordance with claim 2 in which the compound is present in a quantity of about 0.01% by weight of the gasoline.

5. A motor fuel in accordance with claim 2 in which $R_3$ and $R_4$ are hydrogen.

6. A motor fuel in accordance with claim 2 in which $R_3$ is hydrogen and $R_4$ is an alkyl radical.

7. A motor fuel in accordance with claim 2 which contains tetraethyl lead.

8. A motor fuel in accordance with claim 5 in which the compound is carbamylethyl di-2-ethylhexyl dithiophosphate in the quantity of about 0.01% by weight of the motor fuel.

9. A motor fuel in accordance with claim 5 in which the compound is carbamylmethyl di-2-ethylhexyl dithiophosphate in the quantity of about 0.01% by weight of the motor fuel.

10. A motor fuel in accordance with claim 7 in which the compound is N-t-butyl carbamylethyl di-2-ethylhexyl dithiophosphate in the quantity of about 0.01% by weight of the motor fuel.

11. A motor fuel in accordance with claim 7 which contains substantial quantities of olefinic and aromatic hydrocarbons.

12. A motor fuel in accordance with claim 11 in which said compound is present in a quantity between 0.005 and 5% by weight.

13. A motor fuel in accordance with claim 11 in which said compound is dissolved in the motor fuel in the quantity of about 0.01% by weight.

References Cited in the file of this patent

UNITED STATES PATENTS

| | | |
|---|---|---|
| 2,405,560 | Campbell | Aug. 13, 1946 |
| 2,494,283 | Cassaday et al. | Jan. 10, 1950 |
| 2,765,220 | Yust et al. | Oct. 2, 1956 |

FOREIGN PATENTS

| | | |
|---|---|---|
| 683,405 | Great Britain | Nov. 26, 1952 |
| 695,841 | Great Britain | Aug. 19, 1953 |
| 709,471 | Great Britain | May 26, 1954 |
| 709,653 | Great Britain | June 2, 1954 |
| 733,820 | Great Britain | July 20, 1955 |

UNITED STATES PATENT OFFICE
CERTIFICATE OF CORRECTION

Patent No. 2,890,947  June 16, 1959

Weldon G. Annable et al.

It is hereby certified that error appears in the printed specification of the above numbered patent requiring correction and that the said Letters Patent should read as corrected below.

Column 1, line 47, for "system for" read -- system of --; column 4, line 44, for the claim reference numeral "7" read -- 6 --.

Signed and sealed this 3rd day of November 1959.

(SEAL)
Attest:
KARL H. AXLINE
Attesting Officer

ROBERT C. WATSON
Commissioner of Patents